United States Patent [19]

Spink et al.

[11] Patent Number: 5,028,410
[45] Date of Patent: Jul. 2, 1991

[54] HYDROMETALLURGICAL PRODUCTION OF ZINC OXIDE FROM ROASTED ZINC CONCENTRATES

[75] Inventors: Donald R. Spink, Waterloo; Murry C. Robinson, Don Mills; Kim D. Nguyen, Waterloo, all of Canada

[73] Assignee: Material-Concepts-Research Limited, Don Mills, Canada

[21] Appl. No.: 480,374

[22] Filed: Feb. 14, 1990

Related U.S. Application Data

[63] Continuation of Ser. No. 82,242, Aug. 6, 1987, abandoned.

[30] Foreign Application Priority Data

Aug. 7, 1986 [GB] United Kingdom ............... 8619284

[51] Int. Cl.$^5$ .............................................. C01G 9/02
[52] U.S. Cl. .................................... 423/622; 423/105; 210/197
[58] Field of Search ................. 423/101, 105, 109; 75/103, 115, 120, 654, 725; 210/197

[56] References Cited

U.S. PATENT DOCUMENTS

| | | | |
|---|---|---|---|
| 875,866 | 1/1908 | Sulman | 423/101 |
| 1,204,843 | 11/1916 | Bretherton et al. | 75/103 |
| 2,055,613 | 9/1936 | Sessions | 423/109 |
| 2,603,554 | 7/1952 | Calbeck | 423/622 |
| 2,839,388 | 6/1958 | Van Hare, Jr. et al. | 423/109 |
| 3,523,787 | 8/1970 | Ullrich et al. | 423/105 |
| 3,582,317 | 6/1971 | Gamo et al. | 423/109 |
| 3,674,476 | 7/1972 | Tamai et al. | 423/622 |
| 3,753,692 | 8/1973 | Bourchier et al. | 75/115 |
| 4,071,357 | 1/1978 | Peters | 423/622 |
| 4,071,609 | 1/1978 | Robinson | 423/622 |
| 4,118,458 | 10/1978 | Robinson | 423/109 |
| 4,317,803 | 3/1982 | Wilkomirsky et al. | 423/99 |
| 4,689,146 | 8/1987 | Kasai et al. | 210/197 |

FOREIGN PATENT DOCUMENTS

| | | | |
|---|---|---|---|
| 513008 | 5/1976 | U.S.S.R. | 423/622 |
| 228244 | 1/1925 | United Kingdom . | |

Primary Examiner—Curtis R. Davis
Assistant Examiner—R. Bruce Breneman
Attorney, Agent, or Firm—Rogers, Bereskin & Parr

[57] ABSTRACT

A process is provided for obtaining high quality high surface area zinc oxide from a roasted zinc sulphide concentrate by leaching with an ammoniacal ammonium carbonate solution. The process utilizes optional preliminary oxidation and water leaching steps to remove soluble impurities and an optional aqueous sulphur dioxide leaching step to selectively remove readily soluble zinc oxide. The process also includes an optional reduced pressure calcining step to produce zinc oxide with further increased surface area.

12 Claims, 1 Drawing Sheet

HYDROMETALLURGICAL PRODUCTION OF ZINC OXIDE FROM ROASTED ZINC CONCENTRATES

This application is a continuation of application Ser. No. 07/082,242 filed Aug. 6, 1987, now abandoned.

FIELD OF THE INVENTION

This invention relates to the production of high quality zinc oxide from roasted zinc sulphide concentrates.

BACKGROUND OF THE INVENTION

By "roasted zinc sulphide concentrates" is meant the product obtained by roasting a zinc sulphide bearing concentrate. The term zinc calcine is also used to refer to such products. Typically, roasted zinc sulphide concentrates contain zinc oxide and other components, including zinc sulphate, zinc sulphide, mixtures of metal oxides such as copper, lead, calcium, cadmium, and magnesium, zinc ferrite, magnetite, and possibly some haemetite. Aqueous ammoniacal ammonium carbonate solutions are used to selectively leach zinc from roasted zinc sulphide concentrates, leaving a substantial portion of the iron components in the leach residue.

Ammoniacal ammonium carbonate solutions have been suggested for treating zinc scrap and mini-steel plant baghouse dusts to recover zinc oxide. However, it was not previously known that such solutions could be used to leach roasted zinc sulphide concentrates, which are dissimilar to zinc scrap and baghouse dust, to produce such high quality, high surface area zinc oxide as are obtained by this invention. Zinc oxide with the high specific surface area produced by this invention can be classed as premium zinc oxide.

BRIEF SUMMARY OF THE INVENTION

The process of this invention has been found to produce high quality zinc oxides having surface areas substantially greater than 10 $m^2/g$. This is considerably greater than is achieved by the conventional processes known as the French process and the American process for producing high purity commercial zinc oxide. Such processes produce zinc oxide with a surface area less than about 10 $m^2/g$ as a result of the pyrometallurgical steps which are used.

The process of this invention includes optional steps of using preliminary oxidation and water leaching. These steps are used to solubilize and remove a substantial amount of various impurities that might otherwise dissolve during aqueous ammoniacal ammonium carbonate leaching such as sulphur, cadmium and calcium compounds. Also, the oxidized iron may be rendered less soluble for the subsequent leaching step with aqueous ammoniacal ammonium carbonate solutions.

The process further includes an optional step of leaching the roasted zinc sulphide concentrate with aqueous sulphur dioxide, prior to leaching with the ammoniacal ammonium carbonate, to selectively dissolve zinc oxide. This aqueous sulphur dioxide leach step can be practiced with or without the above-mentioned heating and water leaching steps.

In accordance with another aspect of this invention, the surface area of the zinc oxide product of the above leaching steps can be further increased by calcining under a reduced pressure atmosphere.

BRIEF DESCRIPTION OF THE DRAWING

Several exemplary embodiments of the present invention will now be described.

DESCRIPTION OF THE PREFERRED EMBODIMENTS

Figure 1:
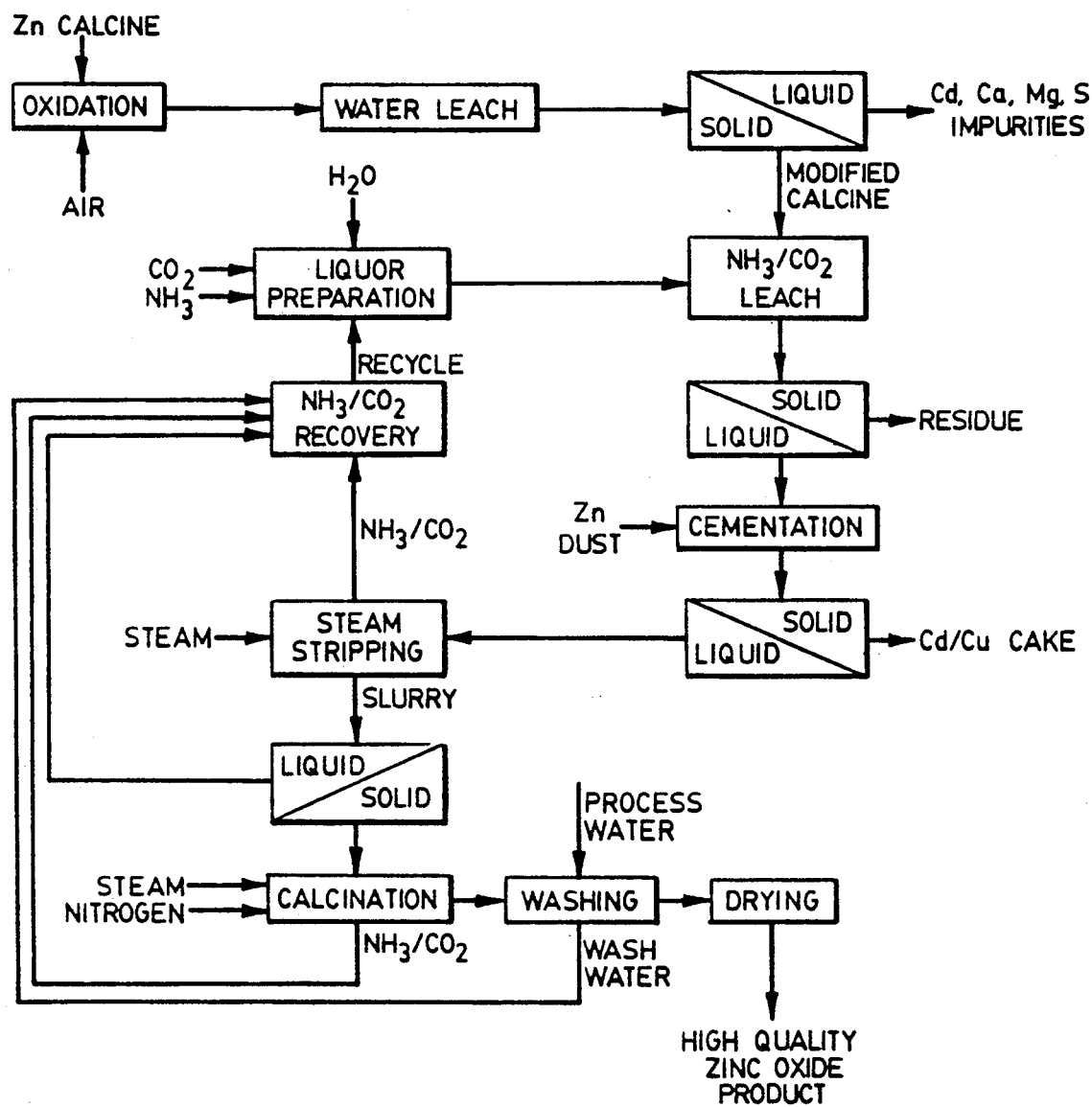
FIG. 1 is a flowsheet of one embodiment of the invention, wherein a conventional zinc calcine is first oxidized and leached with water to remove soluble impurities and is then leached with an aqueous ammoniacal ammonium carbonate solution to selectively leach zinc oxide.

In this first embodiment, a conventionally produced zinc calcine from a commercial zinc sulphide concentrate roasting operation is treated to produce high purity, high surface area zinc oxide. Such a calcine would be expected to contain iron components primarily as zinc ferrite with a small quantity of magnetite ($Fe_3O_4$) and possibly haemetite ($Fe_2O_3$) Minor amounts of sulphur could be present in the form of sulphides and/or sulphates.

The first step in this embodiment is to heat treat the commercial calcine in the presence of air at atmospheric pressure at a temperature between 200° C. and 850° C. to oxidize any magnetite to the $Fe_2O_3$ form. This step should also oxidize various compounds including calcium and cadmium compounds to form water soluble compounds. In order to oxidize both the iron and sulphur components, a preferred minimum temperature of 400° C. should be used.

The modified calcine thus produced is then subjected to a water leaching step to dissolve any soluble salts. This water leaching step selectively separates metals such as cadmium, calcium and magnesium, as well as sulphur compounds, from the zinc contained in the calcine. The oxidation of iron to its $Fe_2O_3$ form renders the iron less soluble in the subsequent leaching step with aqueous ammoniacal ammonium carbonate to enhance the selective leaching dissolution of zinc in that leaching step.

The resultant modified calcine is then leached in an aqueous ammoniacal ammonium carbonate solution, preferably at a temperature close to about 50° C. and a pH of about 11. After leaching, the leach liquor is separated from the insoluble residue by liquid-solid separation techniques, including the washing of the residue to free it from entrained leachate.

The leach liquor is subsequently purified to eliminate copper and any remaining cadmium. A two-stage cementation process using zinc powder is conveniently used, however, other techniques such as solvent extraction could also be used. A clear, colourless leach liquor is separated from the solid cementation product by liquid-solid separation techniques.

The purified leach liquor is then subjected to a steam stripping step to release ammonia, which gas is recycled to the ammoniacal ammonium carbonate leaching step. This step results in the production of a white precipitate of basic zinc carbonate. After liquid-solid separation, the basic zinc carbonate product is washed, dried and subsequently calcined. The calcining step is preferably conducted between 400° C. and 600° C. under a steam and nitrogen environment, to produce high purity, high surface area zinc oxide. Carbon dioxide evolved during the calcination step is recycled to the ammoniacal ammonium carbonate leaching step.

In the second embodiment of the invention, an aqueous sulphur dioxide leaching step is used prior to the leaching with ammoniacal ammonium carbonate to dissolve a portion of the soluble zinc. In this embodiment, the roasted zinc sulphide concentrate is preferably first oxidized and treated with a water leaching step, as in the first embodiment, to remove soluble salts and to convert any iron to its $Fe_2O_3$ form. The modified calcine is then subjected to a brief leaching step with aqueous sulphur dioxide to dissolve some of the soluble zinc. The sulphur dioxide leach liquor containing dissolved zinc is thereafter treated to recover the zinc as zinc oxide. The leach residue is washed and is then subjected to the ammoniacal ammonium carbonate leaching step, and the subsequent purification, steam stripping and calcination steps as disclosed for the first embodiment. One advantage of this second embodiment is that the zinc leaching is conducted in two stages, thereby enabling production of two zinc oxide products of different qualities.

The partially roasted zinc sulphide concentrate, so produced, is subjected to an aqueous ammoniacal ammonium carbonate leaching step, as is described for the first embodiment. The leach liquor so produced is subjected to the purification, steam stripping and calcination steps as disclosed for the first embodiment to produce a high quality zinc oxide product.

In the third embodiment of the invention, the basic zinc carbonate product produced after the steam stripping step of any of the above two embodiments is calcined at reduced pressure to produce extremely high surface area zinc oxide without significantly affecting the purity of the product. This zinc calcining step is preferably performed at temperatures between 250° C. to 350° C. under vacuum in a moist environment.

By way of illustration, the surface area of the zinc oxide product produced by this modified calcination step would be expected to be in the order of 40–90 $m^2/g$ as opposed to 15–30 $m^2/g$, which would be produced with atmospheric calcination in the first two embodiments.

It will be understood that the process of this invention could also be conducted in accordance with the above disclosed first embodiment, omitting the preliminary oxidation and water leaching step.

The process of the present invention is further illustrated in the following examples.

EXAMPLE 1

In this example a conventional zinc calcine was treated in accordance with the process disclosed above as a first embodiment. The process was conducted with a commercial roasted zinc sulphide concentrate which was analyzed to contain 67.8% Zn, 0.33% Cd, 8.70% Fe and 0.64% Cu, all expressed as weight percentages.

The calcine was heat treated at 850° C. for three hours in a muffle furnace at atmospheric pressure in the presence of air. The calcine was spread in a thin layer on a quartz plate to facilitate air oxidation. The calcine was then air cooled to 300° C. at ambient pressure, then to 25° C. in a dessicator. The calcine was then water washed at 25° C. and dried over night in an oven at 110° C. The cooled, dried modified calcine was analyzed to contain 70.8% Zn, 0.13% Cd, 9.49% Fe and 0.68% Cu. It is evident that the combined oxidation and water leaching steps have selectively removed cadmium in preference to zinc.

The modified calcine was then leached in an aqueous ammoniacal ammonium carbonate solution which was prepared by feeding gaseous carbon dioxide into a concentrated ammonium hydroxide solution with vigorous stirring. The final pH of this solution was 10.6. An amount of 480 g of modified calcine was leached in 1.6 liters of this aqueous ammoniacal ammonium carbonate solution with agitation at a temperature of 50° C. Leaching was conducted for one hour with the occasional addition of gaseous ammonia or carbon dioxide gas to control the pH between 10.6 and 11.2. The leach residue from this step was separated by liquid-solid separation and the majority of the iron present in the modified zinc concentrate reported with the residue. The separated leach liquor was found to contain 157 g/l of zinc, as well as 0.225 g/l of cadmium, 0.21 g/l of iron and 1.04 g/l of copper.

The separated leach liquor was then purified by contacting with 16 g/l of zinc dust, which was added in two equal amounts at 40° C. to cement out impurity metals. At the end of each cementation step the solution was separated from the cementation cake. The final purified solution was found to contain 152.02 g/l of zinc and 0.12 g/l of iron, while no copper or cadmium was detected.

The purified zinc solution obtained from the cementation step was heated to 70° C. and then steam stripped for a period of 1.5 hours to remove ammonia. A white precipitate of basic zinc carbonate was formed and the pH dropped to 8.9. An analysis of the basic zinc carbonate precipitate showed a content of 60.16% zinc and 0.054% iron while no copper or cadmium were detected.

The zinc precipitate was calcined at 500° C. to produce a zinc oxide product which was analyzed to contain 80.06% zinc, 0.068% iron, 0.002% copper and no cadmium.

EXAMPLE 2

This example is included to demonstrate the optional oxidation and water leaching step conducted prior to the ammoniacal ammonium carbonate leaching to remove soluble metals, and sulphates, and oxidize iron to its $Fe_2O_3$ form.

The roasted zinc sulphide concentrate feedstock for this example was initially analyzed to contain 66.8% zinc, 0.318% cadmium, 8.55% iron, 0.066% magnesium, 0.072% lead, 0.670% copper, 0.058% calcium, 0.313% silicon 0.081% tin, 0.114% aluminum and 1.41% sulphur as $SO_2$.

This feedstock was heat treated at 810° C. for a period of three hours with an air flow rate of 3 cubic feet per hour. The cooled product was then water leached in the manner disclosed in the first example. The modified calcine product was analyzed as follows: 69.6% zinc, 0.107% cadmium, 0.676% copper, 0.053% magnesium, 0.018% calcium, and 0.13% sulphur, as total $SO_2$. This indicates a three fold improvement in the ratio of zinc to cadmium, a ten fold improvement in the ratio of zinc to sulphur, more than a three fold improvement in zinc to calcium and a 1.3 improvement in the ratio of zinc to magnesium. Other metals such as iron, copper, lead, silicon, tin and aluminum, did not change in concentration significantly during the oxidation and water leaching steps. However, many of these elements are subsequently removed in the ammoniacal ammonium carbonate leach residue or the subsequent cementation steps in accordance with the process of this invention.

EXAMPLE 3

In this example, a zinc calcine was treated in accordance with the process disclosed above as a first embodiment. The assay of the zinc calcine is contained in Table 1.

The zinc calcine was heat treated at 810° C. for three hours in a muffle furnace in the presence of air at atmospheric pressure. The air flow rate was 3 cubic feet per hour. The calcine was spread in a thin layer on a quartz plate to facilitate compete oxidation of the calcine. After re-roasting, the calcine was air-cooled to about 300° C. then further to 25° C. inside a dessicator. The re-roasted calcine was then washed in water. After water washing, the wet calcine was dried overnight in an oven at 110° C., cooled inside a dessicator and then ground to a −65 mesh size. The assay of the water washed, re-roasted calcine is also contained in Table 1.

The modified calcine was then leached in an aqueous ammoniacal ammonium carbonate solution which was prepared by feeding gaseous carbon dioxide into a concentrated ammonium hydroxide solution with vigorous stirring The final pH of this solution was 10.75.

180 g of re-roasted, water washed calcine was leached in 600 ml of aqueous ammoniacal ammonium carbonate solution under the following conditions:

pH: 11
Solids loading: 300 g/l
Leach temperature: 50° C.
Leach time: 30 minutes

The leach residue from this step was separated by liquid-solid separation. The assay of the resultant leach liquor is also reported in Table 1.

TABLE 1

| Element | Assay Zinc Calcine (wt %) | Assay Re-roasted & Washed (wt %) | Assay Leach Liquor (g/l) |
|---|---|---|---|
| Zn | 66.85 | 70.29 | 178.0 |
| Cd | 0.318 | 0.144 | 0.258 |
| Fe | 8.552 | 8.906 | 0.058 |
| Cu | 0.670 | 0.738 | 0.965 |
| Mg | 0.066 | 0.052 | 0.051 |
| Mn | 0.017 | 0.018 | nil |
| Pb | 0.072 | 0.071 | 0.056 |
| Ca | 0.058 | 0.016 | 0.034 |
| Si | 0.241 | 0.226 | 0.021 |
| Co | 0.016 | 0.017 | 0.022 |
| Sn | 0.081 | 0.076 | 0.013 |
| Al | 0.114 | 0.119 | 0.010 |
| Ni | 0.002 | 0.002 | nil |
| S | 1.40 | 0.14 | — |

The separated leach liquor was then purified by a two-stage zinc dust cementation. In the first stage, cementation was carried out for twenty minutes at a solution pH of 10.8–11 and a solution temperature of 40° C. 8 g/l of fine zinc dust was used to cement out almost all the copper in the leach liquor. In the second stage, cementation was carried out for five minutes at a solution pH of 10.8–11, a solution temperature of 40° C. and with the addition of 8 g/l of fine zinc dust. The second stage succeeded in removing all traces of lead. At the end of each cementation step, the solution was separated from the cementation cake. The assay of the leach liquor after each cementation stage is shown in Table 2.

The purified zinc solution obtained from the cementation steps was steam-stripped for thirty minutes at a temperature between 92°–96° C. The final pH of the steam-stripped solution was 7.8. The resultant basic zinc carbonate was separated and analyzed. The assay of the carbonate is also shown in Table 2.

The resultant basic zinc carbonate was separated into two halves, each of which was calcined under different conditions. One half was calcined at 500° C. and atmospheric pressure in a tray calciner under a steam and nitrogen environment for one hour. The other half was calcined at 250° C. for two hours under vacuum (62–70 cm Hg) in a moist steam environment. The assay of the resultant zinc oxide for each calcination procedure is shown in Table 2.

TABLE 2

| Element | Cementation First Stage (g/l) | Cementation Second Stage (g/l) | Basic Zinc Carbonate (wt %) | Calcination Vacuum (wt %) | Calcination Atm Pressure (wt %) |
|---|---|---|---|---|---|
| Zn | 169.0 | 158.0 | 60.07 | 80.01 | 80.1 |
| Cd | nil | nil | nil | nil | nil |
| Fe | 0.023 | 0.018 | 0.008 | 0.007 | 0.008 |
| Cu | nil | nil | 0.001 | 0.002 | 0.001 |
| Mg | 0.050 | 0.044 | 0.017 | 0.023 | 0.021 |
| Mn | nil | nil | nil | nil | nil |
| Pb | 0.001 | nil | nil | nil | nil |
| Ca | 0.029 | 0.026 | 0.012 | 0.015 | 0.014 |
| Si | 0.019 | 0.020 | 0.019 | 0.02 | 0.020 |
| Co | nil | nil | nil | nil | nil |
| Sn | 0.01 | 0.01 | nil | nil | nil |
| Al | 0.010 | 0.008 | 0.005 | 0.008 | 0.006 |
| Ni | nil | nil | nil | nil | nil |
| S | — | — | — | — | — |

The zinc oxide which was calcined under vacuum conditions had a specific surface area of 74.0 $m^2/g$ and the zinc oxide which was calcined at atmospheric pressure had a specific surface area of 24.32 $m^2/g$.

We claim:

1. A process for the production of zinc oxide from a roasted zinc sulphide concentrate, comprising the steps of:
   (a) providing a roasted zinc sulphide concentrate which has been prepared by a process other than a sulphation roast and which includes zinc oxide and minor amounts of sulphur in the form of sulphides and/or sulfates;
   (b) slurrying the roasted zinc sulphide concentrate in an aqueous solution of ammoniacal ammonium carbonate to dissolve zinc contained therein;
   (c) separating a zinc bearing leach liquor from the leach slurry;
   (d) purifying the zinc bearing leach liquor to remove at least one of the metals of copper and cadmium;
   (e) steam stripping purified zinc bearing leach liquor to remove ammonia and to precipitate basic zinc carbonate; and
   (f) separating the precipitated zinc carbonate and calcining the carbonate to produce zinc oxide.

2. The process according to claim 1, wherein prior to slurrying with aqueous ammoniacal ammonium carbonate, the roasted zinc sulphide concentrate is heated to oxidize any iron or sulphide contained therein and the oxidized product is then leached with water to remove water soluble metal impurities including zinc sulphate therefrom.

3. A process according to claim 1 or 2, wherein the roasted zinc sulphide concentrate is slurried in an aqueous solution of ammoniacal ammonium carbonate at a temperature of about 50° C. and a pH of about 11.

4. A process according to claim 1 or 2, wherein the zinc bearing leach liquor is purified by at least one zinc cementation stage.

5. A process according to claim 1 or 2, wherein the calcining step (f) is conducted at atmospheric pressure under a steam and nitrogen environment at a temperature between about 400° C. and 800° C.

6. A process according to claim 1 or 2, wherein the calcining step (f) is conducted at a temperature between 250° C. and 450° C. and in a moist environment.

7. A process according to claim 1 or 2, wherein the calcining step (f) is conducted under vacuum at a temperature between 250° C. and 350° C. and in a moist environment.

8. A process according to claim 2, wherein the zinc sulphide concentrate is heated to between 200° C. and 850° C. at atmospheric pressure.

9. A process according to claim 8, wherein the zinc sulphide concentrate is heated to above 400° C.

10. A process according to claim 1 wherein, prior to slurrying the concentrate with ammoniacal ammonium carbonate, the roasted concentrate is leached with water to remove water soluble metal impurities including zinc sulphate therefrom.

11. A process for the production of zinc oxide from a roasted zinc sulphide concentrate, comprising the steps of:

(a) providing a roasted zinc sulphide concentrate which has been prepared by a process other than a sulfation roast and which includes zinc oxide and minor amounts of sulphur in the form of sulphides and/or sulfates;

(b) leaching the roasted concentrate with water to remove water soluble metal impurities including zinc sulphate therefrom;

(c) slurrying the roasted zinc sulphide concentrate in an aqueous solution of ammoniacal ammonium carbonate to dissolve zinc contained therein;

(d) separating a zinc bearing leach liquor from the leach slurry;

(e) purifying the zinc bearing leach liquor to remove at least one of the metals of copper and cadmium;

(f) steam stripping the purified zinc bearing leach liquor to remove ammonia and to precipitate basic zinc carbonate; and (g) separating the precipitated zinc carbonate and calcining the carbonate to produce zinc oxide.

12. A process according to claim 1 or 2, wherein prior to slurrying with aqueous ammoniacal ammonium carbonate, the roasted zinc sulphide concentrate is leached with aqueous sulphur dioxide to remove soluble zinc oxide in a leach slurry, and wherein the resulting solid containing zinc is separated and then treated in accordance with steps (a) through (f).

* * * * *